United States Patent
Kanaya et al.

(10) Patent No.: US 10,787,036 B2
(45) Date of Patent: Sep. 29, 2020

(54) HEAVY-DUTY TIRE

(71) Applicant: SUMITOMO RUBBER INDUSTRIES, LTD., Kobe-shi (JP)

(72) Inventors: Yoshiki Kanaya, Kobe (JP); Ikuo Atake, Kobe (JP); Shuji Kagimoto, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 555 days.

(21) Appl. No.: 15/595,090

(22) Filed: May 15, 2017

(65) Prior Publication Data
US 2017/0334249 A1    Nov. 23, 2017

(30) Foreign Application Priority Data
May 19, 2016    (JP) .................................. 2016-100481

(51) Int. Cl.
*B60C 11/00*    (2006.01)
*B60C 11/13*    (2006.01)
(Continued)

(52) U.S. Cl.
CPC ...... *B60C 11/0083* (2013.01); *B60C 11/0316* (2013.01); *B60C 11/1323* (2013.01);
(Continued)

(58) Field of Classification Search
CPC .................. B60C 11/0083; B60C 11/1323
See application file for complete search history.

(56) References Cited

U.S. PATENT DOCUMENTS 5,458,173 A    10/1995  Yamashita
5,553,646 A    9/1996   Ando et al.
(Continued)

FOREIGN PATENT DOCUMENTS

EP    0 670 229 A1    9/1995
JP    10-250316 A    9/1998
(Continued)

OTHER PUBLICATIONS

Machine translation for Japan 2012-035681 (Year: 2019).*
Extended Search Report dated Sep. 25, 2017 in European Patent application No. 17168641.3.

*Primary Examiner* — Steven D Maki
(74) *Attorney, Agent, or Firm* — Oblon, McClelland, Maier & Neustadt, L.L.P.

(57) ABSTRACT

A heavy-duty tire includes a tread part formed such that the tread part includes a crown profile including tire equator, and a pair of shoulder profiles extending from outer sides of the crown profile to tread edges. In a tire cross section including tire rotation axis in 5% internal pressure state in which the tire is mounted to a normal rim, filled with air at internal pressure of 5% of normal internal pressure and loaded with no load, each of the crown and shoulder profiles has an arc shape convex toward tire radial direction outer side such that ratio Rc/Rs of curvature radius Re of the crown profile to curvature radius Rs of each shoulder profile is 7.0 or more, and a tire axial direction distance from the equator to a connecting point between the crown profile and each shoulder profile is 0.70 or more times a tread half width.

20 Claims, 3 Drawing Sheets

(51) Int. Cl.
*B60C 11/03* (2006.01)
*B60C 15/06* (2006.01)
*B60C 11/16* (2006.01)
*B60C 1/00* (2006.01)

(52) U.S. Cl.
CPC .......... *B60C 15/0628* (2013.01); *B60C 11/03* (2013.01); *B60C 11/1656* (2013.01); *B60C 2001/0058* (2013.01); *B60C 2011/0341* (2013.01); *B60C 2015/0667* (2013.01); *B60C 2200/06* (2013.01); *Y02T 10/862* (2013.01)

(56) References Cited

U.S. PATENT DOCUMENTS

| | | | |
|---|---|---|---|
| 2006/0169383 A1* | 8/2006 | Radulescu | B60C 9/2006 152/538 |
| 2010/0065174 A1* | 3/2010 | Matsunaga | B60C 9/2009 152/209.14 |
| 2011/0192513 A1* | 8/2011 | Hamada | B60C 3/04 152/209.18 |
| 2015/0059941 A1 | 3/2015 | Niwa | |

FOREIGN PATENT DOCUMENTS

| | | | |
|---|---|---|---|
| JP | 3419830 B2 | | 6/2003 |
| JP | 2007-331439 A | | 12/2007 |
| JP | 2012-035681 A | * | 2/2012 |
| WO | WO-98/58810 A1 | * | 12/1998 |

\* cited by examiner

HEAVY-DUTY TIRE

CROSS-REFERENCE TO RELATED APPLICATIONS

The present application is based upon and claims the benefit of priority to Japanese Patent Application No. 2016-100481, filed May 19, 2016, the entire contents of which are incorporated herein by reference.

BACKGROUND OF THE INVENTION

Field of the Invention

The present invention relates to a heavy-duty tire that allows wear resistance of a tread part to be improved while preventing an increase in rolling resistance.

Description of Background Art

For example, Japanese Patent Laid-Open Publication No. 2007-331439 describes a heavy-duty tire. The entire contents of this publication are incorporated herein by reference.

SUMMARY OF THE INVENTION

According to one aspect of the present invention, a heavy-duty tire includes a tread part formed such that the tread part includes a crown profile including a tire equator, and a pair of shoulder profiles extending from outer sides of the crown profile to tread edges, respectively. In a tire cross section including a tire rotation axis in a 5% internal pressure state in which the heavy-duty tire is mounted to a normal rim, filled with air at an internal pressure of 5% of a normal internal pressure and loaded with no load, each of the crown profile and the shoulder profiles has an arc shape that is convex toward a tire radial direction outer side such that a ratio Rc/Rs of a curvature radius Rc of the crown profile to a curvature radius Rs of each of the shoulder profiles is 7.0 or more, and a tire axial direction distance from the tire equator to a connecting point between the crown profile and each of the shoulder profiles is 0.70 or more times a tread half width.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
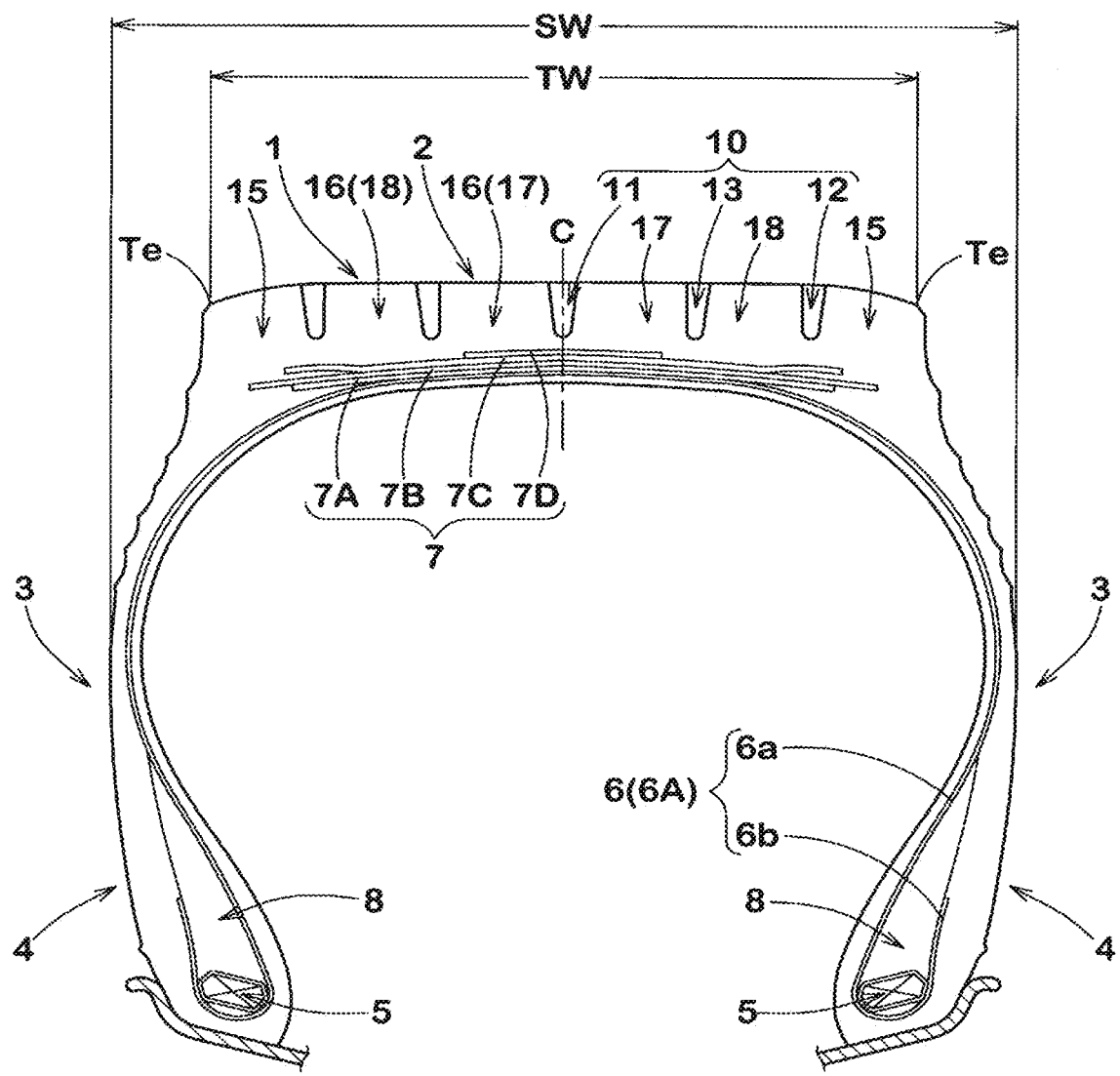
FIG. 1 is a cross-sectional view illustrating a heavy-duty tire according to an embodiment of the present invention.

The embodiments will now be described with reference to the accompanying drawings, wherein like reference numerals designate corresponding or identical elements throughout the various drawings.

FIG. 1 is a tire meridian cross-sectional view, which contains a tire rotation axis, of a heavy-duty tire 1 (hereinafter, may be simply referred to as a "tire") of the present embodiment in a normal state. The term "normal state" refers to a no-load state in which the tire 1 is mounted to a normal rim and is filled with air at a normal internal pressure.

The term "normal rim" refers to a rim for which standards are set for each tire in a system of standards that includes standards on which the tire is based. For example, the term "normal rim" refers to a "Standard Rim" in the JATMA standards, a "Design Rim" in the TRA standards, or a "Measuring Rim" in the ETRTO standards.

The term "normal internal pressure" refers to an air pressure for which standards are set for each tire in a system of standards that includes the standards on which the tire is based, and refers to a "Highest Air Pressure" in the JATMA standards, a maximum value published in the table "Tire Load Limits at Various Cold Inflation Pressures" in the TRA standards, or an "Inflation Pressure" in the ETRTO standards.

As illustrated in FIG. 1, the tire 1 of the present embodiment includes, for example, carcass 6 and a belt layer 7.

The carcass 6 extends, for example, from a tread part 2 through a side wall part 3 to a bead core 5 of a bead part 4. The carcass 6 is formed, for example, of one carcass ply (6A). The carcass ply (6A) is formed, for example, of carcass cords that are arrayed inclined at an angle of 75-90 degrees with respect to a tire circumferential direction.

The carcass ply (6A) includes, for example, a main body part (6a) and a folding-back part (6b). The main body part (6a) extends, for example, from the tread part 2 through the side wall part 3 to the bead core 5. The folding-back part (6b), for example, is connected to the main body part (6a) and is folded back around the bead core 5.

Between the main body part (6a) and the folding-back part (6b), for example, a bead apex rubber 8 is positioned that extends from the bead core 5 in a tapered shape. As a result, the bead part 4 is reinforced.

The belt layer 7 is formed, for example, of four belt plies (7A-7D) using steel cords. The belt plies (7A-7D) are each formed, for example, of belt cords that are arrayed inclined with respect to a tire equator (C). It is desirable that the belt cords of each of the belt plies (7A-7D) be arrayed, for example, inclined in an opposite direction to the belt cords of an adjacent belt ply.

The bead core 5 has, for example, a substantially polygonal cross-sectional shape. The bead core 5 of the present embodiment has, for example, a flattened hexagonal cross-sectional shape.

In the tread part 2, for example, multiple main grooves 10 that each continuously extend in a tire circumferential direction are provided. The main grooves 10 include, for example, a center main groove 11 that is provided on a tire equator (C), shoulder main grooves 12 that are respectively provided on most tread edge (Te) sides, and middle main grooves 13 that are respectively provided between the center main groove 11 and the shoulder main grooves 12.

The tread edges (Te) are respectively tire axial direction outermost side ground contact positions when the tire 1 is loaded with a normal load and is grounded on a flat surface at a camber angle of 0 degree.

The term "normal load" refers to a load for which standards are set for each tire in a system of standards that includes the standards on which the tire is based, and refers to a "Maximum Load Capacity" in the JATMA standards, a maximum value published in the table "Tire Load Limits at Various Cold Inflation Pressures" in the TRA standards, or a "Load Capacity" in the ETRTO standards.

The tread part 2 has shoulder land portions 15 that are respectively formed on tire axial direction outer sides of the shoulder main grooves 12, and crown land portions 16 that are respectively formed between the shoulder main grooves 12 and the center main groove 11. The crown land portions 16 include first crown land portions 17 that are each formed between the center main groove 11 and a middle main groove 13, and second crown land portions 18 that are each formed between a shoulder main groove 12 and a neighboring middle main groove 13.

Figure 2:
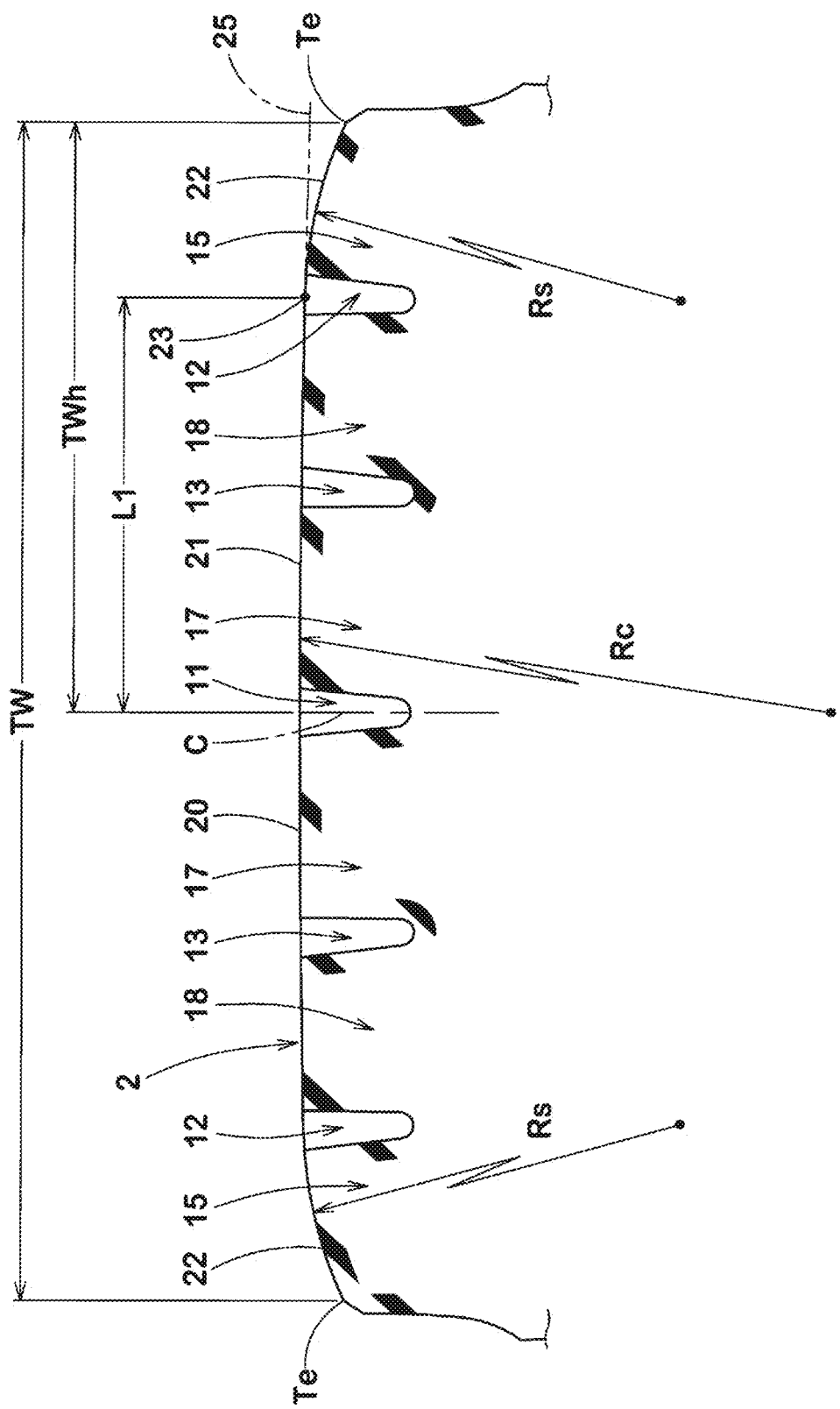
FIG. 2 is an enlarged cross-sectional view of a tread part of FIG. 1.

FIG. 2 illustrates an enlarged view of a profile 20 of the tread part 2 of FIG. 1 in a 5% internal pressure state. The term "5% internal pressure state" refers to a no-load state in which the tire 1 is mounted to a normal rim and is filled with air at an internal pressure of 5% of the normal internal pressure. In the following, unless otherwise specified, values of dimensions of the parts of the tire are values measured in the 5% internal pressure state. The profile 20 of the tread part 2 refers to an outer contour line of the tread part 2 in a state in which the grooves provided in the tread part 2 are filled so as to be smoothly continuous with tread surfaces of the land portions.

As illustrated in FIG. 2, the profile 20 of the tread part 2 includes a crown profile 21 that includes the tire equator (C), and a pair of shoulder profiles 22 that respectively extend from both outer sides of the crown profile 21 to the tread edges (Te). The crown profile 21 and the shoulder profiles 22 each have an arc shape that is convex toward a tire radial direction outer side.

When the crown profile 21 has a small curvature radius, a ground contact pressure tends to concentrate on a central portion of the tread part 2 during running of the tire. In an embodiment of the present invention, a ratio (Rc/Rs) of a curvature radius (Rc) of the crown profile 21 to a curvature radius (Rs) of each of the shoulder profiles 22 is 7.0 or more.

A tire axial direction distance (L1) from the tire equator (C) to a connecting point 23 between the crown profile 21 and each of the shoulder profiles 22 is 0.70 or more times a tread half width (TWh). The tread half width (TWh) is a tire axial direction distance from the tire equator (C) to each of the tread edges (Te) in the 5% internal pressure state.

The crown profile 21 has a sufficiently large curvature radius as compared to the shoulder profiles 22, and the distance (L1) from the tire equator (C) to each of the connecting points 23 is ensured to be as large as 0.70 or more times the tread half width (TWh). Therefore, during running of the tire, a ground contact pressure does not concentrate on a central portion of the tread part 2 but is dispersed throughout the entire tread part 2. Therefore, wear resistance of the tread part 2 improves.

Further, the shoulder profiles 22 each have a significantly small curvature radius as compared to the crown profile 21, and a formation range of each of the shoulder profiles 22 is also set to be small. Therefore, an increase in a rubber volume of the shoulder land portions 15 is suppressed, and thus, an increase in tire weight and heat generation in the shoulder land portions 15 can be prevented. Therefore, an increase in rolling resistance can be prevented.

When the ratio (Rc/Rs) is less than 7.0, the curvature radius (Rc) of the crown profile 21 is relatively small, and thus, there is a risk that the crown land portions 16 may be easily worn out. In order to achieve improvement in wear resistance and reduction in rolling resistance of the tread part 2 in a well-balanced manner, the ratio (Rc/Rs) is preferably 7.5 or more and 9.5 or less, and more preferably 8.0 or more and more 9.0 or less.

The curvature radius (Rs) of each of the shoulder profiles 22 of the present embodiment is, for example, 150-300 mm. Such shoulder profile 22 can help prevent heat generation in the shoulder land portions 15 and thus can prevent an increase in rolling resistance.

The curvature radius (Rc) of the crown profile 21 of the present embodiment is preferably 1050 mm or more and 2850 mm or less, and more preferably 1200 mm or more and 2400 mm or less. As a result, a sufficiently flat crown profile 21 is obtained, and thus, wear of the crown land portions 16 can be effectively suppressed.

When the distance (L1) is less than 0.70 times the tread half width (TWh), the formation ranges of the shoulder profiles 22 become large and thus, there is a risk that a heat generation amount of the shoulder land portions 15 may increase. From this point of view, the distance (L1) is preferably 0.73 or more times the tread half width (TWh).

When the distance (L1) is large, a width of the crown profile 21 becomes excessively large, and thus, there is a risk that the rolling resistance may increase and wet performance may deteriorate. Therefore, the distance (L1) is preferably 0.80 or less times the tread half width (TWh), and more preferably 0.77 or less times the tread half width (TWh).

As a further preferred embodiment, the connecting points 23 of the present embodiment are respectively positioned within the shoulder main grooves 12. When the connecting points are positioned on the shoulder land portions 15 or the crown land portions 16, stresses concentrate near the connecting points 23, and there is a risk that uneven wear may occur.

It is desirable that the shoulder profiles 22 be respectively formed, for example, on tire radial direction inner sides of imaginary extension lines 25 that are respectively obtained by smoothly extending the crown profile 21 to the tread edge (Te) sides. Such shoulder profiles 22 reduce a ground contact pressure acting on the shoulder land portions 15 and thus can prevent heat generation of the shoulder land portions 15.

Figure 3:
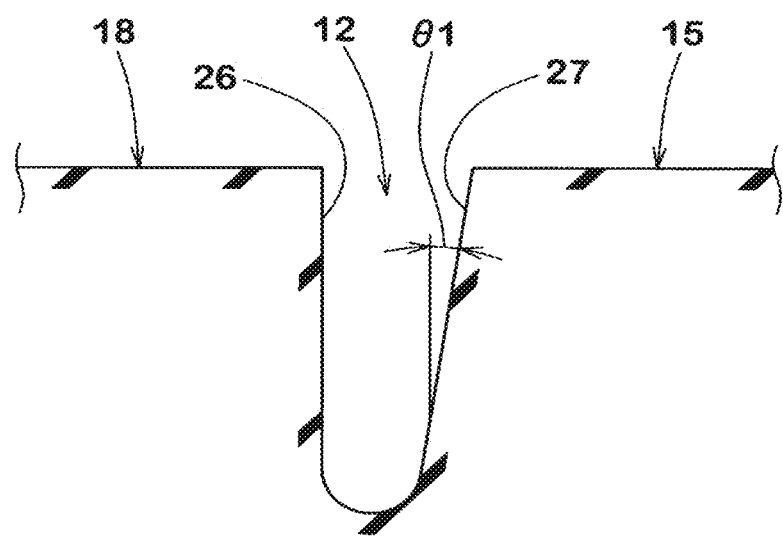
FIG. 3 is an enlarged cross-sectional view of a shoulder main groove of FIG. 1.

FIG. 3 illustrates an enlarged cross-sectional view of a shoulder main groove 12 of FIG. 2. As illustrated in FIG. 3, the shoulder main groove 12 has an inner groove wall 26 that is on the tire equator (C) side and an outer groove wall 27 that is on the tread edge (Te) side and is inclined toward a tire radial direction outer side on the tread edge (Te) side. Further, the outer groove wall 27 is inclined at an angle ($\theta_1$) greater than that of the inner groove wall 26 with respect to the tire radial direction. The angle ($\theta_1$) is, for example, 5-10 degrees. As a result, uneven wear of tire axial direction inner side edges of the shoulder land portions 15 can be suppressed.

The inner groove wall 26 desirably extends, for example, along the tire radial direction. Such an inner groove wall 26 and the above-described outer groove wall 27 can drain water in the groove to a tire axial direction outer side during wet running.

As illustrated in FIG. 1, in the normal state, a tread width (TW) of the tread part 2 is preferably 0.80 or more and 0.95 or less times a tire maximum width (SW), and more preferably 0.85 or more and 0.90 or less times the tire maximum width (SW). By applying the above-described crown profile 21 and shoulder profiles 22 to the tire 1 having such a relatively large tread width (TW), a more remarkable effect can be expected.

In the above, a heavy-duty tire according to an embodiment of the present invention is described in detail. However, without being limited to the above-described specific embodiment, the present invention can also be embodied in various modified forms.

EXAMPLES

Heavy-duty tires each having a size of 12R22.5 and a basic structure of FIG. 1 are prototyped based on specifications shown in Table 1. As Comparative Example 1, a heavy-duty tire, for which the ratio (Rc/Rs) of the curvature radius (Re) of the crown profile to the curvature radius (Rs) of each of the shoulder profiles is less than 7.0, is prototyped. As Comparative Example 2, a heavy-duty tire, for which the distance (L1) from the tire equator to each of the connecting points is less than 0.70 times the tread half width (TWh), is prototyped. For each of the test tires, a wear amount of the crown land portions and rolling resistance are tested. Specifications of the test tires are as follows.

Tire Size: 12R22.5
Rim Size: 8.25×22.5
Tire Internal Pressure: 800 kPa
Test Vehicle: 10 ton loaded truck loaded with 50% of standard load capacity in front of loading platform
Tire Mounting Positions: All wheels A test method is as follows.

Wear Amount of Crown Land Portions

After the test vehicle is driven a predetermined distance on a dry road surface, a wear amount of the crown land portions is measured. The result is expressed as an index number with a wear amount of the crown land portions of Comparative Example 1 as 100. A smaller index number indicates a smaller wear amount of the crown land portions and a better wear resistance of the tread part.

Rolling Resistance

Rolling resistance of each of the test tires is measured using a rolling resistance testing machine. Detailed conditions are as follows. The result is expressed as an index number with rolling resistance of Comparative Example 1 as 100. A smaller index number indicates a smaller rolling resistance.

Vertical Load: 5 kN
Speed: 80 km/h

The test results are shown in Table 1.

the tread part to be improved while preventing an increase in the rolling resistance.

For example, Japanese Patent Laid-Open Publication No. 2007-331439 describes a heavy-duty tire in which, in order to suppress river wear of shoulder land portions, a curvature radius of a profile of a crown land portion is about 1.5-2.0 times a curvature radius of a profile of a shoulder land portion.

However, in the heavy-duty tire of Japanese Patent Laid-Open Publication No. 2007-331439, a large ground contact pressure tends to act on a crown land portion and thus, the crown land portion tends to wear out early. On the other hand, it is conceivable to enlarge the curvature radius of the profile of the crown land portion to disperse a ground contact pressure acting on the crown land portion throughout the entire tread part.

However, when the curvature radius of the profile of the crown land portion is large, a rubber volume on a shoulder land portion side increases, and rolling resistance tends to increase due to an increase in tire weight and a large heat generation in the shoulder land portions.

A heavy-duty tire according to an embodiment of the present invention allows wear resistance of a tread part to be improved while preventing an increase in rolling resistance.

A heavy-duty tire according to an embodiment of the present invention includes a tread part. In a tire cross section including a tire rotation axis in a 5% internal pressure state in which the tire is mounted to a normal rim and is filled with air at an internal pressure of 5% of a normal internal pressure and is loaded with no load, a profile of the tread part includes a crown profile that includes a tire equator, and a pair of shoulder profiles that respectively extend from both outer

TABLE 1

|  | Comparative Example 1 | Comparative Example 2 | Example 1 | Example 2 | Example 3 | Example 4 | Example 5 |
|---|---|---|---|---|---|---|---|
| Crown Profile Curvature Radius (Rc) (mm) | 600 | 1200 | 1200 | 720 | 1200 | 720 | 1050 |
| Shoulder Profile Curvature Radius (Rs) (mm) | 150 | 150 | 150 | 90 | 150 | 90 | 150 |
| (Curvature Radius (Rc))/(Curvature Radius (Rs)) | 4.0 | 8.0 | 8.0 | 8.0 | 8.0 | 8.0 | 7.0 |
| (Distance (L1) from Tire Equator to Connecting Point)/(Tread Half Width (TWh)) | 0.85 | 0.6 | 0.75 | 0.75 | 0.85 | 0.85 | 0.75 |
| Crown Land Portion Wear Amount (Index Number) | 100 | 97 | 89 | 94 | 92 | 94 | 92 |
| Rolling Resistance (Index Number) | 100 | 103 | 95 | 94 | 94 | 93 | 94 |

|  | Example 6 | Example 7 | Example 8 | Example 9 | Example 10 | Example 11 | Example 12 |
|---|---|---|---|---|---|---|---|
| Crown Profile Curvature Radius (Rc) (mm) | 1125 | 1350 | 1425 | 1500 | 1800 | 2100 | 2400 |
| Shoulder Profile Curvature Radius (Rs) (mm) | 150 | 150 | 150 | 150 | 150 | 150 | 150 |
| (Curvature Radius (Rc))/(Curvature Radius (Rs)) | 7.5 | 9.0 | 9.5 | 10.0 | 12.0 | 14.0 | 16.0 |
| (Distance (L1) from Tire Equator to Connecting Point)/(Tread Half Width (TWh)) | 0.75 | 0.75 | 0.75 | 0.75 | 0.75 | 0.75 | 0.75 |
| Crown Land Portion Wear Amount (Index Number) | 91 | 89 | 89 | 89 | 90 | 90 | 91 |
| Rolling Resistance (Index Number) | 95 | 96 | 96 | 95 | 95 | 96 | 96 |

|  | Example 13 | Example 14 | Example 15 | Example 16 | Example 17 | Example 18 | Example 19 |
|---|---|---|---|---|---|---|---|
| Crown Profile Curvature Radius (Rc) (mm) | 1600 | 2000 | 2400 | 1200 | 1200 | 1200 | 1200 |
| Shoulder Profile Curvature Radius (Rs) (mm) | 200 | 250 | 300 | 150 | 150 | 150 | 150 |
| (Curvature Radius (Rc))/(Curvature Radius (Rs)) | 8.0 | 8.0 | 8.0 | 8.0 | 8.0 | 8.0 | 8.0 |
| (Distance (L1) from Tire Equator to Connecting Point)/(Tread Half Width (TWh)) | 0.75 | 0.75 | 0.75 | 0.7 | 0.73 | 0.77 | 0.8 |
| Crown Land Portion Wear Amount (Index Number) | 90 | 90 | 92 | 92 | 90 | 89 | 89 |
| Rolling Resistance (Index Number) | 95 | 95 | 95 | 96 | 95 | 96 | 96 |

From results of the tests, it can be confirmed that the pneumatic tires of Examples allow the wear amount of the crown land portions to be reduced and the wear resistance of sides of the crown profile to tread edges. The crown profile and the shoulder profiles each have an arc shape that is convex toward a tire radial direction outer side. A ratio (Rc/Rs) of a curvature radius (Rc) of the crown profile to a curvature radius (Rs) of each of the shoulder profiles is 7.0 or more. A tire axial direction distance from the tire equator to a connecting point between the crown profile and each of the shoulder profiles is 0.70 or more times a tread half width.

In a heavy-duty tire according to an embodiment of the present invention, it is desirable that the distance be 0.80 or less times the tread half width.

In a heavy-duty tire according to an embodiment of the present invention, it is desirable that the curvature radius (Rs) of each of the shoulder profiles be 150-300 mm.

In a heavy-duty tire according to an embodiment of the present invention, it is desirable that the curvature radius (R) of the crown profile be 1200-2400 mm.

In a heavy-duty tire according to an embodiment of the present invention, it is desirable that a shoulder main groove that continuously extends in a tire circumferential direction be provided in the tread part on a tread edge side on at least one side of the tire equator, and the connecting point be positioned in the shoulder main groove.

In a heavy-duty tire according to an embodiment of the present invention, it is desirable that the shoulder main groove have an inner groove wall that is on the tire equator side and an outer groove wall that is on the tread edge side and is inclined toward a tire radial direction outer side on the tread edge side, and the outer groove wall be inclined at an angle greater than that of the inner groove wall with respect to the tire radial direction.

In a heavy-duty tire according to an embodiment of the present invention, it is desirable that the shoulder profiles be respectively formed on tire radial direction inner sides of imaginary extension lines that are respectively obtained by smoothly extending the crown profile to the tread edge sides.

In a heavy-duty tire according to an embodiment of the present invention, it is desirable that, in a tire cross section including a tire rotation axis in a no-load normal state in which the tire is mounted to a normal rim and is filled with air at an internal pressure of 5% of a normal internal pressure, a tread width of the tread part be 0.80-0.95 times a tire maximum width.

In a heavy-duty tire according to an embodiment of the present invention, the crown profile has a sufficiently large curvature radius as compared to the shoulder profiles, and the distance from the tire equator to each of the connecting points is ensured to be as large as 0.70 or more times the tread half width. Therefore, during running of the tire, a ground contact pressure does not concentrate on a central portion of the tread part but is dispersed throughout the entire tread part. Therefore, wear resistance of the tread part improves.

Further, in a heavy-duty tire according to an embodiment of the present invention, the shoulder profiles each have a significantly small curvature radius as compared to the crown profile, and a formation range of each of the shoulder profiles is also set to be small. Therefore, an increase in a rubber volume of the shoulder land portions is suppressed, and thus, an increase in tire weight and heat generation in the shoulder land portions can be prevented. Therefore, an increase in rolling resistance can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A heavy-duty tire, comprising:
   a tread part having a crown profile including a tire equator, and a pair of shoulder profiles extending from outer sides of the crown profile to tread edges, respectively such that a curvature radius Rc of the crown profile is in a range of 720 mm to 2400 mm and that a curvature radius Rs of each of the shoulder profiles is in a range of 150 mm to 300 mm,
   wherein in a tire cross section including a tire rotation axis in a 5% internal pressure state in which the heavy-duty tire is mounted to a normal rim, filled with air at an internal pressure of 5% of a normal internal pressure and loaded with no load, each of the crown profile and the shoulder profiles has an arc shape that is convex toward a tire radial direction outer side such that a ratio Rc/Rs of the curvature radius Rc of the crown profile to the curvature radius Rs of each of the shoulder profiles is in a range of 7.0 to 16.0, and a tire axial direction distance from the tire equator to a connecting point between the crown profile and each of the shoulder profiles is in a range of 0.73 to 0.8 times a tread half width.

2. The heavy-duty tire of claim 1, wherein the crown profile and the shoulder profiles are formed such that the tire axial direction distance is in a range of 0.75 to 0.8 times the tread half width.

3. The heavy-duty tire of claim 2, wherein the shoulder profiles are formed such that the curvature radius Rs of each of the shoulder profiles is in a range of 150 mm to 250 mm.

4. The heavy-duty tire of claim 2, wherein the tread part has a shoulder main groove continuously extending in a tire circumferential direction on a tread edge side on at least one side of the tire equator, and the tread part is formed such that the connecting point is positioned in the shoulder main groove.

5. The heavy-duty tire of claim 4, wherein the tread part is formed such that the shoulder main groove has an inner groove wall on the tire equator side, and an outer groove wall on the tread edge side and inclined toward a tire radial direction outer side on the tread edge side, and that the outer groove wall is inclined at an angle greater than an angle of the inner groove wall with respect to the tire radial direction.

6. The heavy-duty tire of claim 2, wherein the shoulder profiles are formed such that the shoulder profiles are respectively positioned on tire radial direction inner sides of imaginary extension lines where the imaginary extension lines are respectively obtained by smoothly extending the crown profile to the tread edge sides.

7. The heavy-duty tire of claim 2, wherein in the tire cross section including the tire rotation axis in a normal state in which the heavy-duty tire is mounted to the normal rim and is filled with air at the internal pressure of the normal internal pressure and is loaded with no load, the tread part has a tread width in a range of 0.80 to 0.95 times a tire maximum width.

8. The heavy-duty tire of claim 1, wherein the shoulder profiles are formed such that the curvature radius Rs of each of the shoulder profiles is in a range of 150 mm to 250 mm.

9. The heavy-duty tire of claim 8, wherein the tread part has a shoulder main groove continuously extending in a tire circumferential direction on a tread edge side on at least one side of the tire equator, and the tread part is formed such that the connecting point is positioned in the shoulder main groove.

10. The heavy-duty tire of claim 9, wherein the tread part is formed such that the shoulder main groove has an inner groove wall on the tire equator side, and an outer groove wall on the tread edge side and inclined toward a tire radial direction outer side on the tread edge side, and that the outer groove wall is inclined at an angle greater than an angle of the inner groove wall with respect to the tire radial direction.

11. The heavy-duty tire of claim 8, wherein the shoulder profiles are formed such that the shoulder profiles are respectively positioned on tire radial direction inner sides of imaginary extension lines where the imaginary extension lines are respectively obtained by smoothly extending the crown profile to the tread edge sides.

12. The heavy-duty tire of claim 8, wherein in the tire cross section including the tire rotation axis in a normal state in which the heavy-duty tire is mounted to the normal rim and is filled with air at the internal pressure of the normal internal pressure and is loaded with no load, the tread part has a tread width in a range of 0.80 to 0.95 times a tire maximum width.

13. The heavy-duty tire of claim 1, wherein the crown profile is formed such that the curvature radius Rc of the crown profile is in a range of 1050 mm to 2400 mm.

14. The heavy-duty tire of claim 13, wherein the tread part has a shoulder main groove continuously extending in a tire circumferential direction on a tread edge side on at least one side of the tire equator, and the tread part is formed such that the connecting point is positioned in the shoulder main groove.

15. The heavy-duty tire of claim 1, wherein the tread part has a shoulder main groove continuously extending in a tire circumferential direction on a tread edge side on at least one side of the tire equator, and the tread part is formed such that the connecting point is positioned in the shoulder main groove.

16. The heavy-duty tire of claim 15, wherein the tread part is formed such that the shoulder main groove has an inner groove wall on the tire equator side, and an outer groove wall on the tread edge side and inclined toward a tire radial direction outer side on the tread edge side, and that the outer groove wall is inclined at an angle greater than an angle of the inner groove wall with respect to the tire radial direction.

17. The heavy-duty tire of claim 1, wherein the shoulder profiles are formed such that the shoulder profiles are respectively positioned on tire radial direction inner sides of imaginary extension lines where the imaginary extension lines are respectively obtained by smoothly extending the crown profile to the tread edge sides.

18. The heavy-duty tire of claim 1, wherein in the tire cross section including the tire rotation axis in a normal state in which the heavy-duty tire is mounted to the normal rim and is filled with air at the internal pressure of the normal internal pressure and is loaded with no load, the tread part has a tread width in a range of 0.80 to 0.95 times a tire maximum width.

19. The heavy-duty tire of claim 1, wherein the crown profile is formed such that the curvature radius Rc of the crown profile is in a range of 1200 mm to 2400 mm.

20. The heavy-duty tire of claim 1, wherein each of the crown profile and the shoulder profiles is formed such that the ratio Rc/Rs of the curvature radius Rc of the crown profile to the curvature radius Rs of each of the shoulder profiles is in a range of 7.5 to 9.5.

* * * * *